United States Patent [19]

Martin

[11] Patent Number: 4,472,229
[45] Date of Patent: Sep. 18, 1984

[54] METHOD OF MAKING A LAMINATED SHEET PRODUCT

[75] Inventor: Graham E. Martin, Nunthorpe, England

[73] Assignee: Imperial Chemical Industries Limited, London, England

[21] Appl. No.: 282,951

[22] Filed: Jul. 13, 1981

[30] Foreign Application Priority Data

Jul. 29, 1980 [GB] United Kingdom ............... 8024696
Aug. 29, 1980 [GB] United Kingdom ............... 8028055
Mar. 27, 1981 [GB] United Kingdom ............... 8109676

[51] Int. Cl.$^3$ .................................................. C09J 5/02
[52] U.S. Cl. ........................... 156/307.1; 156/307.7; 428/286; 428/288; 428/296; 428/524; 428/525; 428/526; 428/530
[58] Field of Search ............... 428/286, 288, 296, 524, 428/525, 526, 530; 156/307.1, 307.7; 162/123, 125, 129, 145, 146, 157 R, 205, 206

[56] References Cited

U.S. PATENT DOCUMENTS 3,101,294 8/1963 Fridrichsen .
3,592,767 7/1971 Pall .
4,032,457 6/1977 Matchett .
4,202,959 5/1980 Henbest et al. .

FOREIGN PATENT DOCUMENTS 9322 4/1980 European Pat. Off. .
14026 8/1980 European Pat. Off. .
19383 11/1980 European Pat. Off. .
572962 10/1945 United Kingdom .
573115 8/1980 United Kingdom .
1573116 8/1980 United Kingdom .
1574344 9/1980 United Kingdom .

Primary Examiner—Marion E. McCamish
Attorney, Agent, or Firm—Cushman, Darby & Cushman

[57] ABSTRACT

Sheet products are made from amino-aldehyde, e.g. urea-formaldehyde, resin fibres in admixture with other non-cellulosic fibres, e.g. glass fibres, and optionally cellulosic fibres. Multiply products may be made from plies having the above constitution and plies of, for example, amino-aldehyde resin fibres, alone or in admixture with cellulosic and/or non-cellulosic fibres. The paper-like sheet materials may be used e.g. as filter papers.

Laminated products may be made by pressing at an elevated temperature, a stack of plies of paper made from a mixture of amino-aldehyde resin fibres and another fibrous material, e.g. cellulosic fibres.

9 Claims, No Drawings

METHOD OF MAKING A LAMINATED SHEET PRODUCT

This invention relates to sheet materials and in particular to sheet materials containing amino-aldehyde resin fibres.

In U.K. Patent Specification No. 1573115 and published European Patent Application Nos. 9322 and 14026 sheet materials made from certain mixtures of amino-aldehyde, e.g. urea-formaldehyde, resin fibres and cellulose fibres are described.

According to a first aspect of the present invention particularly useful sheet materials may be made from mixtures of amino-aldehyde resin fibres with other synthetic organic fibres or synthetic or natural inorganic fibres, optionally together with cellulosic fibres.

Accordingly the present invention provides a sheet material comprising a coherent web of randomly disposed fibrous materials, said fibrous materials comprising 10 to 90% by weight of amin-aldehyde resin fibres, 10 to 90% by weight of at least one second fibrous material selected from synthetic inorganic fibres, natural inorganic fibres, and synthetic organic non-cellulosic fibres other than amino-aldehyde resin fibres, and 0 to 75% by weight of cellulosic fibres, said percentages totalling 100%.

Synthetic organic non-cellulosic fibres that may be used include polyamide, polyester, e.g. polyethylene terephthalate, and polyolefin, e.g. polypropylene fibres. Inorganic fibres that may be used include glass fibres and asbestos. The preferred sheet materials contain amino-aldehyde resin fibres, glass fibres, and, optionally, cellulosic fibres.

The nature and diameter of the fibres of the second fibrous material will depend on the intended use of the paper. Thus the use of substantial quantities, e.g. above 30% by weight of the total fibrous material, of very fine fibres, e.g. having an average diameter below 1 $\mu$m, particularly 10 to 200 nm, of the second fibrous material may give papers suitable for use for very fine filtering applications while the use of coarser fibres, e.g. having an average diameter above 1 $\mu$m, particularly above 10 $\mu$m, are of use to give coarse filter papers. The second fibrous material fibres, preferably have an average diameter below 30 $\mu$m.

The amino-aldehyde resin used to make the amino-aldehyde resin fibres is a thermosetting condensate of an amino compound, preferably a polyamine such as urea or melamine, with an aldehyde, particularly formaldehyde. The condensation is generally performed in aqueous solution using a molar excess of the aldehyde. Some, e.g. up to 50% by weight, of the amino compound may be replaced by phenol. Preferred amino resins are made by reacting urea, optionally phenol and/or melamine in an amount of up to 1 mol of phenol and/or melamine per mol of urea, with formaldehyde. The molar ratio of formaldehyde to amino groups (plus phenol groups, if any) is preferably between 0.6:1 and 1.5:1, particularly between 0.7:1 and 1.3:1.

The amino-aldehyde resin fibres may be made by any suitable fibre forming technique such as wet or dry spinning and are preferably formed by centrifugal spinning a solution of the amino-aldehyde resin in a suitable solvent, for example as described in U.K. Patent Specification No. 1573116, or in published European Patent Application No. 19383, which gives, as is preferred, substantially straight and unbranched fibres. So that water may be used as the solvent, the fibres are preferably formed from a condensate of formaldehyde with urea or a mixture of urea and melamine containing less than 5% by weight of melamine.

After reaction of the amino compound and aldehyde, a curing catalyst is added and the resin is spun into fibres. The nature and amount of catalyst, together with the spinning and any post spinning heat treatment conditions, will determine the degree of cure for any given resin.

Examples of weak catalysts include di(ammonium) hydrogen phosphate and ammonium formate: moderate catalysts include formic acid, ammonium sulphate, ammonium chloride and dihydrogen ammonium phosphate; while strong catalysts include phosphoric, sulphuric sulphamic and hydrochloric acids. The amount of catalyst employed will generally be within the range 0.05 to 1% by weight of the resin solids.

The time necessary to effect the required degree of curing will naturally depend on the nature and quantity of catalyst employed, but for any given catalyst and concentration will depend on the curing temperature: at low temperatures longer times are required than at high temperatures. The curing will generally be effected at temperatures of 80° to 200° C.

It will be appreciated that the curing conditions necessary to obtain the desired degree of cure can be determined by simple experimentation. In determining the curing time it should be appreciated that some curing may take place during the spinning process used to convert the resin to the fibrous form.

The amino-aldehyde resin fibres are preferably ones that have been cured to a degree of cure of 90% or more. The degree of cure is assessed by digesting a weighed sample (approx. 5 g) of the dry fibre in 200 ml of water for 2 hours at 50° C. The undissolved fibre remaining is recovered by filtration, dried at 100° C. in air for 2 hours, and then re-weighed.

The % degree of cure is $$\frac{\text{weight of recovered fibre}}{\text{original weight of fibre}} \times 100$$

Unmodified amino-aldehyde resin fibres that have been cured using a catalyst such as ammonium sulphate for 3 or more hours at 120° C. generally have a degree of cure of above 90%.

In some cases however the use of fibres having a lower degree of cure may be desirable as described hereinafter.

Preferably a spinning aid, such as a water soluble high molecular weight polymer, e.g. polyvinyl alcohol or polyethylene oxide, is added to the resin prior to spinning.

Fillers, pigments, optical brighteners and other additives may be added to the fibres provided they do not interfere with the attainment of the desired level of cure.

The amino-aldehyde resin fibres preferably have an average diameter between 1 and 30 $\mu$m, particularly between 1 and 30 $\mu$m, particularly between 2 and 20 $\mu$m, and most particularly between 5 and 15 $\mu$m. Preferably substantially all the amino-aldehyde resin fibres have a diameter between 1 and 30 $\mu$m. It is preferred that there is an insignificant proportion of fibres of diameter above 25 $\mu$m.

The amino-aldehyde resin fibres preferably have an average strength of at least 50 MNm$^{-2}$ (which corresponds approximately to 33 $Nmg^{-1}$), particularly at least 100 $MNm^{-2}$ ($\equiv$67 $Nmg^{-1}$).

The amino-aldehyde resin fibres and the second fibrous material fibres preferably have an average length, weighted by length, of between 1 and 10 mm, particularly between 2 and 6 mm. Preferably substantially all the amino-aldehyde resin fibres and the second fibrous material fibres have a length within the range 1 to 10 mm. Where necessary, the fibres produced by the spinning process may be reduced in length to that required for paper making. This can be achieved by cutting, passing through rollers or milling, or by wet disintegration as is well known in the paper industry. The fibres should be cured to the desired degree of cure prior to any such disintegration process.

In the present invention, the sheet material is a coherent web of randomly disposed fibrous materials. The web may conveniently be made by a wet laid paper making process wherein an aqueous slurry of the fibrous components is deposited on a screen or mesh and the water drained therefrom. The resultant web is generally then pressed and dried.

Amino-aldehyde resin fibres having a degree of cure above 90% are generally non-adhesive although under certain conditions more highly cured amino-aldehyde fibres can be caused to exhibit some adhesion and bond to one another and to other fibrous materials. Such bonding of highly cured amino-aldehyde fibres is herein termed "inter-fibre bonding". As described in European Patent Application No. 81301359.6 which corresponds to U.S. Ser. No. 250,154 filed Apr. 2, 1981 entitled "Fibrous Materials" and bearing the identification B 31266, "interfibre bonding" of fibres having a degree of cure above 93%, may be produced by heating the web at a temperature above 80° C. in the presence of at least 10% by weight of water. The conditions required for the generation of "inter-fibre bonding" e.g. minimum temperature, water content, duration of heating, are inter dependent and also depend on the degree of cure of the amino-aldehyde resin fibres. The drying conditions in the paper making process may be such as to produce "inter-fibre bonding" with highly cured amino-aldehyde resin fibres. "Inter-fibre bonding" is advantageous as it results in an increase in the wet strength of the paper which is particularly desirable where the paper is to be used in filtration applications.

Where the degree of cure of the amino-aldehyde resin fibres is above 90%, and the processing conditions are such that no "inter-fibre bonding" is produced, and the second fibrous material is also non-adhesive, e.g. as is the case with glass fibres, it is necessary to incorporate some cellulosic fibres or a binder to hold the web together. Conventional paper binders such as starch, elastomer latex, or urea-formaldehyde resin may be used. Where the processing conditions are such as to produce "inter-fibre bonding", coherent sheets may be produced from the amino-aldehyde resin fibres plus one or more other non-cellulosic fibres without the use of either cellulosic fibres or a binder.

Where cellulosic fibres are used merely to donate adhesion they are preferably present in an amount of 10–30% by weight of the total fibrous content. Cellulosic fibres that may be used include the lignin-free fibres such as cotton linters or chemical wood pulp e.g. paper making pulp made from the raw cellulose by treatment by chemical means such as the well known sulphate or sulphite processes, or lignin-containing fibres such as mechanical, semi-chemical, or thermomechanical wood pulp.

The cellulose fibres may be lightly beaten or well beaten, depending on the intended use of the paper.

Where the second fibrous material is adhesive or potentially adhesive e.g. thermoplastic, the use of a binder or cellulosic fibres is not essential if the paper can be heated sufficiently to effect softening and local welding of the fibres of the second fibrous material without unduly adversely affecting the paper properties. Likewise where the amino-aldehyde resin fibres have a degree of cure of less than 90% they may be sufficiently adhesive to bind the web without the addition of a binder and/or cellulosic fibres. However even when using adhesive or potentially adhesive fibrous materials, a binder and/or cellulosic fibres may be included.

The sheet material is a web of fibres comprising the amino-aldehyde resin fibres, the second fibrous material fibres and, optionally, cellulosic fibres.

The fibrous constituents of the web forming the sheet material preferably comprise

| amino-aldehyde resin fibres | 40–60% by weight |
| second fibrous material fibres | 10–50% by weight |
| cellulosic fibres | 10–30% by weight |

The sheet material may be a multiply material, e.g. made by forming a plurality of webs, at least one of which contains the amino-aldehyde resin fibres and second fibrous material fibres, and the optionally cellulosic fibres, in the specified proportions, and then bonding said webs together, e.g. as part of the paper making process by using a multiwire paper making machine, or by laminating preformed papers.

In particular a multiply sheet material suitable for use as a filter medium comprises at least two dissimilar coherent plies formed from randomly disposed fibrous materials, the fibrous constituents of at least one ply comprising 0–100% by weight of amino-aldehyde resin fibres, 0–100% by weight of cellulosic fibres and 0–90% by weight of fibres of said second fibrous material, and the fibrous constituents of at least one other ply comprising 10–90% by weight of amino-aldehyde resin fibres, 10–90% by weight of said second fibrous material fibres, and 0–75% by weight of cellulosic fibres.

For example a multiply filter medium may comprise at least one ply of 10 to 100% by weight amino-aldehyde resin fibres, 0 to 90% by weight of coarse (1–30 $\mu$m average diameter) glass fibres, and 0 to 75% by weight of cellulosic fibres, and at least one other ply of 10 to 90% by weight of amino-aldehyde resin fibres, 10 to 90% by weight of fine (10–200 nm average diameter) glass fibres, and 0 to 75% by weight of cellulosic fibres.

In use the first ply is effective to filter out coarse particles while the second ply can filter out very fine particles yet will not be blinded by the coarse particles.

Another useful multiply filter medium comprises at least one ply of 10 to 90% by weight of amino-aldehyde resin fibres, 10 to 90% by weight of coarse glass fibres, and 0 to 75% by weight of cellulosic fibres, and at least one other ply comprising 90–50% by weight of amino-aldehyde resin fibres and 10–50% by weight of well beaten cellulosic fibres.

By the term well beaten is meant that the cellulose fibre has a Canadian Standard Freeness of less than $280x+120$ ml where x is the weight proportion of lignin containing fibres in said cellulosic fibres.

In this case the well beaten cellulose fibre/amino-aldehyde resin fibre ply provides the fine filter.

Sheet materials in accordance with the present invention generally have a higher porosity than sheet materials made using cellulosic fibres in place of the amino-aldehyde resin fibres.

It has also found that sheet materials made from certain amino-aldehyde resin fibres in admixture with cellulosic and/or non-cellulosic fibres are of use as laminating papers.

Certain types of laminated sheet products are made by hot pressing a stack comprising superimposed layers of paper, formed from e.g. cellulose pulp, impregnated with a thermosetting resin such as a thermosetting formaldehyde resin.

The impregnation step is often relatively slow in relation to the paper making step: also the paper generally requires considerable wet strength to enable it to hold together during passage through the bath of the impregnating thermosetting resin.

It has been found that if the paper comprises blends of certain amino-aldehyde resin fibres and other fibrous materials, these disadvantages may be overcome.

Thus such papers made from mixtures of partially cured amino-aldehyde resin fibres and other fibrous materials, e.g. cellulose pulp, can be used as laminating papers without the need for an impregnation step although, as is described hereinafter, an impregnation step may also be employed if desired.

In order to effect lamination, a stack of papers made from partially cured amino-aldehyde resin fibres and other fibrous materials, e.g. cellulose pulp, is pressed, at a temperature above 100° C., under conditions such that the amino-aldehyde resin fibres fuse and flow to effect bonding between adjacent paper plies.

Accordingly as a further aspect of the present invention there is provided a method of making a laminated sheet product comprising pressing at a temperature above 100° C. a stack comprising superimposed layers of paper formed from a fibrous material containing 10 to 90% by weight of amino-aldehyde resin fibres having a degree of cure below 96%, whereby said amino-aldehyde resin fibres fuse to bond together adjacent plies.

The lamination process is preferably conducted so that the amino-aldehyde resin fibres flow to form a continuum: the amino-aldehyde resin may also cure to a higher degree during the lamination process.

A number of factors affect the degree of fusion, flow and hence lamination. These factors include:

1. Degree of cure of the amino-aldehyde resin fibres: the lower the degree of cure, the more readily will lamination occur. To this end the degree of cure should be below 96%, preferably below 93%. However since amino-aldehyde resin fibres having very low degrees of cure tend to have an appreciable solubility in water at the temperatures normally encountered in wet-laid paper making processes, e.g. about 25°–30° C., the use of fibres having very low degrees of cure results in significant loss of amino-aldehyde resin fibres. Consequently it is preferred to use fibres having a degree of cure above 50%, and in particular above 60%. Most preferably the degree of cure is in the range 75 to 93%.

2. Pressing temperature: the higher the temperature, the more rapid will be the fusion and hence lamination. Preferably temperatures above 120° C. are employed. To avoid thermal decomposition and discolouration of the amino-aldehyde resin, the temperature is preferably below 200° C., and in particular is below 180° C.

3. Pressing pressure: as in the case of temperature, the higher the pressure, the more rapid will be the fusion and lamination. The pressure is preferably between 10 and 500 kg cm$^{-2}$ and particularly is in the range 20 to 400 kg cm$^{-2}$.

4. The moisture content of the fibres: while acceptable laminates may be made by pressing dry papers, particularly those containing amino-aldehyde resin fibres having a degree of cure below 93%, lamination is facilitated by the presence of moisture, in particular in an amount exceeding 10% by weight of the fibrous materials in the paper. However during the lamination the moisture is vaporised and is liable to give rise to bubbles in the laminated product. Such bubbles may be avoided by pressing the stack in such a way that vaporised moisture can be expelled from the laminate, for example by conducting the pressing operation against a gas permeable member, e.g. a porous plate, a felt pad, or a fine wire mesh. The use of such gas permeable members enables laminates with textured surfaces to be obtained.

5. The relative proportion of amino-aldehyde resin fibre and other fibrous material in the paper plies. While the higher the proportion of amino-aldehyde resin fibre, the more rapid will be fusion and lamination, the required physical characteristics of the laminate will often dictate the proportions that should be employed. The plies preferably contain 20 to 65% by weight of amino-aldehyde resin fibre. While the remainder of the fibrous material in the paper plies may comprise or contain non-cellulosic fibres, it preferably consists of a cellulose pulp, e.g. a chemical or mechanical pulp. A softwood Kraft pulp is particularly suitable.

6. The pressing time: the longer the pressing time, the better the lamination although, where moist papers are employed, the greater the risk of bubbling. Typically pressing times of 1 to 30 minutes may be used. In the interests of economy and fast production, the time is preferably kept as short as is consistent with satisfactory lamination. Preferred pressing times are in the range 2 to 10 minutes.

Suitable lamination conditions, i.e. the degree of cure, amino-aldehyde resin fibre content, moisture content, temperature, pressure, and time may be determined by simple experimentation. Examples 42 to 120 described hereinafter will give a guide as to suitable and unsuitable combinations of conditions.

The stack of papers from which the laminate is formed preferably contains at least three superimposed plies formed from the fibre mixture. One or more all-cellulose pulp papers may also be included in the stack, although it is preferred that there should not be adjacent all-cellulose papers. One or more of the papers may bear a decorative pattern and/or may contain pigments and/or fillers e.g. opacifying agents.

In some cases it may be desirable to augment the thermosetting resin content of the stack prior to laminating by impregnating the paper made from the mixture of amino-aldehyde resin fibres and cellulose pulp with a suitable thermosetting resin. In this case the presence of the amino-aldehyde resin fibres is advantageous in that it increases the absorbency of the paper, thereby reducing the time required for impregnation. Also by pressing the paper lightly at temperatures above 80° C. in the presence of moisture, which conditions may be attained during drying of paper made by a wet-laid process, some bonding of the amino-aldehyde fibres to one another can be achieved resulting in improved wet strength of the paper. Such improved wet strength is advantageous where an impregnation step is employed.

The invention is illustrated by the following examples.

EXAMPLES 1-8

Paper handsheets were made on a British Standard Handsheet former according to the British Standard method from mixtures, in various proportions, of urea-formaldehyde (UF) fibres made by the process of European Patent Application No. 19383, glass fibres and softwood sulphate cellulose pulp (Kraft).

The urea-formaldehyde resin fibres had a formaldehyde:amino group molar ratio of 1:1 and a degree of curing of 94.9%. The fibres had a mean diameter of 9 $\mu$m.

The glass fibres had a mean diameter of 20 $\mu$m.

The glass and urea-formaldehyde resin fibres had been cut to provide a length distribution between 1 and 5 mm by passing the fibrous material twice through a paper shredding machine with the cutters spaced at a nominal 3 mm.

In accordance with the British Standard method, the handsheets were pressed at room temperature and dried by leaving them at room temperature.

Two sheets were prepared for each variation in the furnish and the grammage (weight per unit area) of each sheet was determined. The Bursting Pressure was measured according to the TAPPI standard procedure at four locations on each sheet. Using the Bursting Pressure and appropriate grammage, 8 Burst Index (Bursting Pressure divided by grammage) were obtained for each furnish and the mean of these Burst Indexes calculated. The results are shown in Table 1.

TABLE 1

| | Furnish composition % by weight | | | Mean Burst Index |
|---|---|---|---|---|
| Example | UF fibre | glass fibre | cellulose pulp | (kPa m$^2$ g$^{-1}$) |
| 1 | 20 | 50 | 30 | 0.51 |
| 2 | 20 | 40 | 40 | 1.13 |
| 3 | 20 | 30 | 50 | 1.80 |
| 4 | 30 | 50 | 20 | 0.42 |
| 5 | 33 | 33 | 34 | 0.87 |
| 6 | 50 | 40 | 10 | 0.35 |
| 7 | 50 | 30 | 20 | 0.49 |
| 8 | 50 | 20 | 30 | 0.75 |

EXAMPLES 9-11

The procedure of Examples 1 to 8 was repeated using various fibre mixtures containing no cellulose pulp.

In order to make coherent sheets, inter-fibre bonding was promoted by varying the procedure employed in Examples 1 to 8. Instead of pressing and drying the sheets at room temperature, the sheets were couched from the wire of the sheet former, placed on a non-stick plate, weighed, sprayed evenly with a little deionised water, reweighed and then pressed on each side for 30 seconds using a domestic ironing press at 170° C. giving an applied pressure of about 0.1 kg cm$^{-2}$. The weight of the dried paper was determined. The solids content of each sheet entering the press was thus determined, and so the moisture content as a percentage of the total fibre content was calculated.

The results are shown in Table 2.

TABLE 2

| | Furnish composition % by weight | | Average Moisture content | Mean Burst Index |
|---|---|---|---|---|
| Example | UF fibre | glass fibre | % by weight | (kPa m$^2$ g$^{-1}$) |
| 9 | 50 | 50 | 452 | 0.39 |
| 10 | 75 | 25 | 363 | 0.37 |
| 11 | 90 | 10 | 571 | 0.27 |

The sheets were coherent and could be handled and used in e.g. filtration applications.

If however the cold pressing/drying technique employed in Examples 1-8 are employed with these cellulose free mixtures, coherent sheets are not obtained.

EXAMPLES 12-19

The procedure of Examples 9-11 was repeated but using various mixtures of glass, UF, and cellulose fibres. The results are shown in Table 3.

TABLE 3

| | Furnish composition (%) | | | Average Moisture | Mean Burst Index |
|---|---|---|---|---|---|
| Example | Uf fibres | Glass fibre | Cellulose pulp | content % | (kPa m$^2$ g$^{-1}$) |
| 12 | 20 | 50 | 30 | 475 | 0.41 |
| 13 | 20 | 40 | 40 | 388 | 0.83 |
| 14 | 20 | 30 | 50 | 432 | 1.17 |
| 15 | 30 | 50 | 20 | 549 | 0.31 |
| 16 | 33 | 33 | 34 | 446 | 0.68 |
| 17 | 50 | 40 | 10 | 585 | 0.26 |
| 18 | 50 | 30 | 20 | 367 | 0.34 |
| 19 | 50 | 20 | 30 | 381 | 0.64 |

EXAMPLES 20-28

The procedure of Examples 1-8 was repeated using, in place of the glass fibres, 1.5 denier, drawn, uncrimped polyethylene terephthalate (PET) fibres that had been washed in warm water to remove any spin finish from their surfaces.

The results are shown in Table 4.

TABLE 4

| | Furnish composition % by weight | | | Mean Burst Index |
|---|---|---|---|---|
| Example | UF fibre | PET fibres | celluslose pulp | (kPa m$^2$ g$^{-1}$) |
| 20 | 20 | 50 | 30 | 1.67 |
| 21 | 20 | 40 | 40 | 1.02 |
| 22 | 20 | 30 | 50 | 1.06 |
| 23 | 30 | 50 | 20 | 0.90 |
| 24 | 30 | 40 | 30 | 1.19 |
| 25 | 33 | 33 | 34 | 0.85 |
| 26 | 50 | 40 | 10 | 0.98 |
| 27 | 50 | 30 | 20 | 0.60 |
| 28 | 50 | 20 | 30 | 1.52 |

EXAMPLES 29-41

Examples 9-19 were repeated using the polyethylene terephthalate fibres as used in Examples 20-28 in place of the glass fibres. The results are shown in Table 5.

TABLE 5

| Ex- ample | Furnish composition (%) UF fibres | PET fibres | Cellulose pulp | Average Moisture content % | Mean Burst Index (kPa m² g⁻¹) |
|---|---|---|---|---|---|
| 29 | 50 | 50 |  | 405 | 0.28 |
| 30 | 75 | 25 |  | 438 | 0.34 |
| 31 | 90 | 10 |  | 421 | 0.25 |
| 32 | 20 | 50 | 30 | 604 | 0.33 |
| 33 | 20 | 40 | 40 | 567 | 0.69 |
| 34 | 20 | 30 | 50 | 499 | 1.05 |
| 35 | 30 | 50 | 20 | 459 | 0.28 |
| 36 | 30 | 40 | 30 | 513 | 0.61 |
| 37 | 30 | 30 | 40 | 502 | 0.71 |
| 38 | 33 | 33 | 34 | 465 | 0.70 |
| 39 | 50 | 40 | 10 | 510 | 0.26 |
| 40 | 50 | 30 | 20 | 506 | 0.36 |
| 41 | 50 | 20 | 30 | 478 | 0.73 |

All the papers of Examples 9–19 and 29–41 exhibited inter-fibre bonding between the urea-formaldehyde resin fibres and the glass or PET fibres, and with the cellulose fibres where the latter were also present. All these papers retained their integrity when immersed in water.

In the following Examples, laminates were made by pressing at an elevated temperature a stack of paper plies. The paper of the splies were made on a British Standard Handsheet former according to the British Standard method from mixtures, in various proportions, of urea-formaldehyde (UF) resin fibres of various degrees of cure having a formaldehyde:amino group molar ratio of 1:1 and softwood sulphate cellulose pulp (Kraft). In the tables 6–10 below, the quality of the laminated product is designated as:

p=poor. Little or no lamination so that the plies can be peeled apart.
m=moderate. Some lamination but some of the UF fibres have not fused and flowed form a continuum.
g=good. A continuum formed and the plies cannot be peeled apart.

A suffix b indicates that there were bubbles in the product.

EXAMPLES 42–66

In these examples the proportion of UF fibres was 50% by weight. The pressing conditions are shown in Table 6.

TABLE 6

| Example | % Cure | No. of plies | Pressing Conditions Temp. (°C.) | Pressure (kg cm⁻²) | Time (Min) | Laminate Quality |
|---|---|---|---|---|---|---|
| 42 | 76 | 2 | 120 | 200 | 5 | p |
| 43 | 76 | 2 | 120 | 250 | 5 | m |
| 44 | 76 | 2 | 150 | 200 | 3 | g |
| 45 | 76 | 8 | 150 | 200 | 3 | g |
| 46 | 76 | 6 | 150 | 250 | 4 | g |
| 47 | 90 | 4 | 150 | 200 | 3 | g |
| 48 | 90 | 4 | 150 | 250 | 3 | g |
| 49 | 90 | 4 | 150 | 400 | 3 | g |
| 50 | 90 | 4 | 150 | 400 | 5 | g |
| 51 | 90 | 5 | 150 | 150 | 3 | g |
| 52 | 90 | 5 | 150 | 200 | 3 | g |
| 53 | 90 | 5 | 150 | 200 | 4 | g |
| 54 | 90 | 5 | 150 | 250 | 5 | g |
| 55 | 90 | 6 | 150 | 400 | 1 | p |
| 56 | 90 | 6 | 150 | 400 | 2 | g |
| 57 | 90 | 6 | 150 | 400 | 5 | g |
| 58 | 90 | 6 | 150 | 400 | 8 | gb |
| 59 | 90 | 6 | 150 | 400 | 10 | gb |
| 60 | 96 | 6 | 120 | 400 | 4 | p |
| 61 | 96 | 6 | 120 | 400 | 6 | p |
| 62 | 96 | 6 | 150 | 400 | 1 | p |
| 63 | 96 | 6 | 150 | 400 | 2 | g |
| 64 | 96 | 6 | 150 | 400 | 4 | g |
| 65 | 96 | 6 | 150 | 400 | 5 | gb |
| 66 | 96 | 6 | 150 | 400 | 6 | gb |

EXAMPLES 67–88

In these examples the proportion of UF fibres was 30% by weight. All stacks were 6 ply and were pressed at 150° C. The other conditions are shown in Table 7.

TABLE 7

| Example | % Cure | Pressing conditions Pressure (kg cm⁻²) | Time (min) | Laminate Quality |
|---|---|---|---|---|
| 67 | 84 | 100 | 5 | p |
| 68 | 84 | 100 | 10 | m |
| 69 | 84 | 100 | 15 | m |
| 70 | 84 | 100 | 20 | g |
| 71 | 91 | 100 | 10 | p |
| 72 | 91 | 100 | 15 | p |
| 73 | 91 | 100 | 20 | m |
| 74 | 91 | 100 | 25 | m |
| 75 | 91 | 100 | 30 | g |
| 76 | 92 | 100 | 15 | p |
| 77 | 92 | 100 | 20 | p |
| 78 | 92 | 400 | 2 | p |
| 79 | 92 | 400 | 3 | g |
| 80 | 92 | 400 | 4 | gb |
| 81 | 92 | 400 | 5 | gb |
| 82 | 95 | 400 | 1 | p |
| 83 | 95 | 400 | 2 | m |
| 84 | 95 | 400 | 3 | mb |
| 85 | 95 | 400 | 5 | mb |
| 86 | 96 | 400 | 5 | p |
| 87 | 96 | 400 | 6 | pb |
| 88 | 96 | 400 | 8 | pb |

In the following examples, to assist lamination, the plies were moistened by spraying them with water before assembling the stack. The water content quoted in Tables 8–10 is the ratio, expressed as a percentage, of the weight of the stack of moistened plies, less the sum of the weights of the individual plies before moistening, to the sum of the weights of the individual plies before moistening.

All laminates were 6 ply and pressed at 150° C.

EXAMPLES 89–93

The UF fibres had a degree of cure of 91% and the proportion of UF fibres in the unmoistened plies were 30% by weight. All laminates were pressed under a pressure of 100 kg cm⁻². The other details are shown in Table 8.

TABLE 8

| Example | Water content % | Pressing time (min) | Laminate quality |
|---|---|---|---|
| 89 | 36 | 5 | gb |
| 90 | 52 | 5 | gb |
| 91 | 172 | 5 | gb |
| 92 | 63 | 10 | gb |
| 93 | 56 | 20 | gb |

To try to ovecome the bubbling in the following Examples 94–120, the laminate was pressed against a gas permeable member inserted in the press, namely a felt pad in Examples 94–117 and a fine wire mesh in Examples 118–120.

EXAMPLES 94–108

The proportion of UF fibres in the unmoistened plies was 30% by weight. All laminates were pressed under a pressure of 100 kg cm$^{-2}$. The other details are shown in Table 9.

TABLE 9

| Example | % Cure | Water content (%) | Pressing time (min.) | Laminate quality |
|---|---|---|---|---|
| 94  | 84 | 14  | 5  | g |
| 95  | 84 | 22  | 5  | g |
| 96  | 84 | 45  | 5  | g |
| 97  | 92 | 19  | 5  | g |
| 98  | 92 | 50  | 5  | g |
| 99  | 92 | 116 | 5  | g |
| 100 | 92 | 22  | 10 | g |
| 101 | 92 | 40  | 10 | g |
| 102 | 92 | 24  | 15 | g |
| 103 | 92 | 44  | 15 | g |
| 104 | 95 | 0   | 5  | p |
| 105 | 95 | 76  | 5  | g |
| 106 | 95 | 136 | 5  | g |
| 107 | 95 | 82  | 10 | g |
| 108 | 95 | 47  | 20 | g |

EXAMPLES 109–120

To ascertain whether lower pressures could be employed, the pressing pressure was reduced to 20 kg cm$^{-2}$. The degree of cure of the UF fibres was 91% and the proportion of UF fibres in the unmoistened plies was 40% by weight. The other details are shown in Table 10.

TABLE 10

| Example | Water content % | Pressing time (min) | Laminate quality |
|---|---|---|---|
| 109 | 188 | 10 | g |
| 110 | 29  | 15 | g |
| 111 | 169 | 15 | g |
| 112 | 195 | 20 | g |
| 113 | 80  | 25 | g |
| 114 | 120 | 25 | g |
| 115 | 100 | 30 | g |
| 116 | 133 | 30 | g |
| 117 | 117 | 35 | g |
| 118 | 110 | 20 | g |
| 119 | 134 | 20 | g |
| 120 | 48  | 25 | g |

I claim:
1. A method of making a laminated sheet product comprising the steps of:
   (a) forming fibers from an amino-aldehyde resin;
   (b) curing said fibers by heating at between 80° C. and 200° C. until said fibers have a degree of cure between 50% and 96%;
   (c) forming said cured fibers, in admixture with fibers other than amino-aldehyde resin fibers having a degree of cure below 96%, into paper, the fibrous material of said paper containing 10% to 90% by weight of said amino-aldehyde resin fibers having a degree of cure between 50% and 96%;
   (d) forming a stack containing superimposed plies of said paper; and
   (e) pressing said stack at a temperature of at least 100° C., the pressing conditions being such that said amino-aldehyde resin fibers having a degree of cure between 50% and 96% fuse to bond together adjacent plies.

2. A method according to claim 1 wherein the plies are free of any thermosetting resin impregnant.

3. A method according to claim 1 wherein the amino-aldehyde resin fibres have a degree of cure in the range 75 to 93%.

4. A method according to claim 1 wherein the fibrous material of the paper plies contains 20 to 65% by weight of amino-aldehyde resin fibres.

5. A method according to claim 1 wherein the stack is pressed at 120° to 200° C.

6. A method according to claim 1 wherein the stack is pressed at a pressure of 10 to 500 kg cm$^{-2}$.

7. A method according to claim 1 wherein the paper plies, before pressing, contain at least 10% by weight of water, based on the weight of the fibrous material in the paper plies.

8. A method according to claim 7 wherein the stack is pressed against a gas permeable member.

9. A method according to claim 8 wherein the gas permeable member is a felt pad or a wire mesh.

* * * * *